(12) United States Patent
Merrill et al.

(10) Patent No.: US 7,494,677 B2
(45) Date of Patent: Feb. 24, 2009

(54) COATED FOOD PRODUCTS AND METHODS OF PRODUCING COATED FOOD PRODUCTS WITH REDUCED PERMEABILITY TO FAT AND OIL

(75) Inventors: Richard Merrill, Highlands Ranch, CO (US); David LeMay, Centennial, CO (US); Laura E. Colin-Diaz, Thornton, CO (US)

(73) Assignee: Leprino Foods Company, Denver, CO (US)

( * ) Notice: Subject to any disclaimer, the term of this patent is extended or adjusted under 35 U.S.C. 154(b) by 243 days.

(21) Appl. No.: 10/977,540

(22) Filed: Oct. 29, 2004

(65) Prior Publication Data

US 2005/0106296 A1    May 19, 2005

Related U.S. Application Data

(60) Provisional application No. 60/515,917, filed on Oct. 29, 2003.

(51) Int. Cl.
*A23J 1/20*    (2006.01)

(52) U.S. Cl. .......................... 426/89; 426/94; 426/302; 426/657

(58) Field of Classification Search ................ 426/302, 426/89, 303, 94, 656, 657
See application file for complete search history.

(56) References Cited

U.S. PATENT DOCUMENTS

| | | | | | |
|---|---|---|---|---|---|
| 5,266,340 | A | * | 11/1993 | Samson et al. | 426/92 |
| 5,401,518 | A | * | 3/1995 | Adams et al. | 426/89 |
| 5,527,549 | A | * | 6/1996 | Bernacchi et al. | 426/89 |
| 5,601,760 | A | * | 2/1997 | Rosenberg | 264/4.1 |

* cited by examiner

*Primary Examiner*—Arthur L Corbin
(74) *Attorney, Agent, or Firm*—Townsend and Townsend and Crew LLP

(57) ABSTRACT

Coatings containing one or more thermally coagulating proteins (e.g., whey protein) and foodstuffs coated with such coatings are provided. The coatings render foodstuffs less permeable to fat and oil in the frying medium, and thus reduce the amount of fat or oil absorbed by the foodstuff during cooking. The coatings also improve the color, texture and crispiness of the cooked foodstuff. Methods for applying such coatings to obtain the coated foodstuff are also provided.

23 Claims, No Drawings

COATED FOOD PRODUCTS AND METHODS OF PRODUCING COATED FOOD PRODUCTS WITH REDUCED PERMEABILITY TO FAT AND OIL

CROSS REFERENCE TO RELATED APPLICATIONS

This application claims the benefit of U.S. Provisional Application No. 60/515,917, filed Oct. 29, 2003, which is incorporated herein by reference in its entirety for all purposes.

BACKGROUND

A variety of foods such as meat, vegetables and poultry are commonly batter coated, breaded and then cooked by deep fat frying. In addition, many dough products such as pizza dough, scones, and other dough-based food products are fried in oil. Often many of these foods are partially cooked (e.g., par-fried or par-baked) and then frozen. The frozen products are subsequently sold to the food service industry or to consumers for finish cooking, either by baking or finish frying. During such cooking operations, considerable amounts of fat or oil are often absorbed by the food being cooked. The extent to which absorption can occur is illustrated by the fact that a typical oil fried pizza crust often contains about 9.5% oil, which is absorbed during the frying step.

Current research on the absorption of fat and oil into food products indicates that when a food product is removed from oil the condensation of steam produces a vacuum effect (see, e.g., Gamble, et al. (1987) J. Food Engineering 29:227-248). The amount of oil absorbed depends on the amount of water removed and how it is removed from the product after frying. According to Ufheil and Escher (Lebensmittel-Wissenschaft und Technologie 29:640-644, 1996), oil uptake is a surface phenomenon and that the counter-flows of water vapor and oil are related to each other (but are not necessarily synchronized). Similarly, a reduction in "interfacial tension" between the food and the frying oil causes excessive oil pick up by the fried food product.

Tests have shown that most of the oil during frying is confined to the surface area of the food being fried. Furthermore, most of the oil is absorbed during the cooling period after the food product has been fried in oil (see, e.g., Ufheil and Escher (1996) Lebensmittel-Wissenschaft und Technologie 29:640-644; Moreira, R. G., et al. (1997) J. Food Engineering 31:485-498; and Aguilera, J. M. and Gloria-Hernandez, H. (2000) J. Food Science 65:476-479). Some research suggests that the microstructure of the crust or surrounding exterior region of a food product may be the most important determinant of the final oil uptake into that particular food (see, e.g., Bouchon, P. and Pyle, D. L. (2004) J. Food Science: Food Engineering and Physical Properties, vol. 69, Nr. 3).

Recognition of the extent to which current cooking operations result in the absorption of fat and oil raises several concerns. For food processors, the concern is the extra cost associated with replacing fryer oil or fat lost during the cooking process. For consumers, high fat and oil content in food raises dietary and nutritional concerns.

In view of such concerns, various attempts have been made to either reduce oil and fat absorption during frying, or to remove absorbed oil or fat post frying. Strategies for draining excess oil from fried foods include, for example, passing the food over a screen and allowing oil to drain off and/or using high velocity streams of hot air to blow off excess oil. Pre-frying treatments, such as lowering the moisture content of food before frying using microwave, hot-air treatment and/or baking has also been tried as a means to reduce absorption of fat and oil. These approaches, however, often require additional equipment and are time consuming.

To reduce fat absorption, tapioca dextrins and high amylose starches have been applied to food to form insoluble films that hinder oil absorption. Starch based systems, however, can be sensitive to the mode by which the starch is applied and the particular starch utilized. Examples of starch-based coatings are discussed for example in U.S. Pat. Nos. 5,648,110 and 6,001,399. In a related approach, carbohydrates, such as alginates and celluloses, which are water soluble but relatively insoluble in fat and oil, have been applied to foods to reduce oil absorption during frying. But the success of this approach also can depend upon the particular carbohydrate utilized and the mode of application.

Some have suggested that certain proteins be included in coatings applied to foodstuffs to reduce fat or oil absorption, but cautioned against the use of other proteins. Examples of various approaches of this type are discussed in U.S. Pat. Nos. 4,935,251; 5,217,736; 5,527,549; and 6,288,179.

Because of the limitations associated with the foregoing approaches, there thus remains a need for methods that effectively reduce the absorption of fat and/or oil during cooking to accommodate the demands of an increasing number of health-conscious consumers for foods that are lower in fat and caloric content and the demands of food processors for less wasteful cooking methods.

SUMMARY

Compositions that contain thermally coagulating proteins such as whey protein are provided. When applied to foodstuffs and heated to an appropriate temperature, these coatings reduce the permeability of foodstuffs to fat and oil present during the cooking process, thereby reducing the amount of fat or oil that is absorbed by the foodstuff. It is not necessary to heat the coatings in certain applications. Methods for applying compositions to foodstuffs and the resulting coated foodstuffs are also provided.

Some methods that are provided are for preparing a coated foodstuff. Certain methods of this type generally involve providing a foodstuff and then coating the foodstuff with a whey composition. The whey composition comprises at least 12% whey protein by weight, although in certain applications the whey protein concentration is lower (e.g., at least 2% whey protein by weight). The whey protein in the composition includes one or more proteins present in or derived from whey. Other compositions that are applied contain at least 14% whey protein by weight. Still other methods utilize compositions that contain about 14-55% whey protein by weight, or about 14-40% whey protein by weight. The whey composition can be prepared from various sources, including a reduced minerals whey, a high gel whey, a hydrolyzed whey, an acid whey, a sweet whey, a whey protein concentrate, or combinations of the foregoing. The coatings can be applied to diverse types of foodstuff including, for example, cereal-based products, hand-held foods, cheese, poultry, beef, pork, seafood, vegetables, fruit, candy, ice cream cones and nuts.

Various cooking methods are also provided that reduce absorption of fat or oil by the foodstuff during the cooking process. Some of these methods initially involve providing a foodstuff that is coated with a whey composition, wherein the whey composition comprises at least 12% whey protein by weight, the whey protein comprising one or more proteins present in or derived from whey. The foodstuff is then heated in the presence of fat or oil, whereby the whey composition coating the foodstuff forms a film on the foodstuff that reduces absorption of fat or oil by the foodstuff relative to a corresponding uncoated foodstuff. In some instances, the whey protein concentration is lower (e.g., at least 2% whey protein by weight).

Other methods that are disclosed are for reducing the permeability of a foodstuff to oil and fat. These methods typically involve providing a foodstuff that is coated with a whey composition, wherein the whey composition comprises at least 12% whey protein by weight, the whey protein comprising one or more proteins present in or derived from whey. The foodstuff is subsequently heated, whereby the heated whey composition coating the foodstuff reduces the permeability of the foodstuff to oil or fat relative to a corresponding uncoated foodstuff. In some applications, the whey composition comprises at least 2% whey protein by weight.

Some of the coating compositions that are provided include a whey composition that comprises whey protein, the whey protein comprising one or more proteins present in or derived from whey, and an ingredient selected from the group consisting of an oil, a batter, a breading and a starch, or a combination thereof. The whey protein in such coating compositions is about 12%-55% by weight.

Various types of food products are provided. In general these products include a foodstuff and a whey composition coated on the foodstuff that comprises whey protein. The whey protein comprises one or more whey proteins present in or derived from whey; the whey protein concentration is about 0.01 to about 27.0% or about 0.5% to about 27.0% by weight of the food product.

Other food products are those prepared by a method that includes providing a foodstuff and coating the foodstuff with a whey composition. The whey composition comprises at least 12% whey protein by weight, with the whey protein comprises one or more proteins present in or derived from whey.

DETAILED DESCRIPTION

I. Definitions

The terms used herein have the meaning commonly understood by a person of skill in the art to which this invention belongs, as exemplified by the following definitions that are provided for some of the most commonly used terms in the application. For a definition of terms concerning whey and related products, see also, 21 CFR § 184.1979, § 184.1979a, § 184.1979b, and § 184.1979c from the Apr. 1, 2003 edition, which sections are incorporated herein by reference in their entirety for all purposes.

The terms "protein" and "polypeptide" are used interchangeably herein. The terms broadly refer to polymers of amino acids, optionally including amino acid analogues, as well as salts of such polymers.

The term "thermally coagulating protein" as used herein refers to proteins that coagulate to form a film or gel once heated to a sufficiently high temperature such that the proteins denature.

"Whey" generally refers to the liquid substance that is obtained by separating the coagulum from milk, cream, or skim milk in cheesemaking. The two major protein components in whey are α-lactalbumin and β-lactoglobulin. Other major components are lactose and various minerals. "Acid whey" generally refers to whey obtained from a process in which a significant amount of the lactose has been converted to lactic acid, or from the curd formation by direct acidification of milk. "Sweet whey" generally refers to whey obtained from a procedure in which there is insignificant conversion of lactose to lactic acid. "Concentrated whey" is the liquid substance obtained by the partial removal of water from whey, while leaving all other constituents in the same relative proportion. "Dry or dried whey" generally refers to the dry substance obtained by removal of water from whey, while leaving all other constituents in the same relative proportion as in whey. The protein content in whey, sweet whey, acid whey, concentrated whey and dry whey is 10-15% by weight.

"Reduced lactose whey" refers to the substance obtained by the removal of lactose from whey. The protein content is 16-24% by weight.

"Reduced minerals whey" generally refers to the substance obtained by the removal of the minerals from whey, such that the resulting product contains less than 7 percent ash. The protein concentration is 10-24% by weight.

"Whey protein concentrate" (WPC) is the substance obtained by the removal of sufficient nonprotein constituents of whey such that the resulting dry product contains at least 25% protein.

"High gel whey" is whey to which calcium has been added in a sufficient amount to promote or facilitate thermal coagulation of whey protein to form a film or gel.

"Hydrolyzed whey" is whey in which the protein present in the whey has been at least partially hydrolyzed using enzymes.

A "coat" or a "coating" generally refers to one or more layers of composition (e.g., a whey composition) that is applied to an exterior surface of a foodstuff. A coating typically does not extend into the whole foodstuff, but instead resides relatively close to the surface of the foodstuff. This, however, is not required; in some instances, the coating can extend throughout the foodstuff, particularly for foodstuffs that are relatively thin. A coating may be applied to a limited portion of the foodstuff (e.g., one side), but can also be applied such that the entire exterior surface of the foodstuff is coated (e.g., when the foodstuff is submerged into the coating composition).

A "batter" as used herein has its usual meaning in the art and generally refers to flour, starch, or egg-based compositions that are used to coat foodstuffs in preparation for frying. The term includes compositions that are applied with overcoatings and undercoatings of flour or breadings, and includes tempura batters. Batters can be leavened or unleavened and typically are formed by mixing one or more flours or starch ingredients with about 50-75% water by weight. Typical flour and starch ingredients used in a batter include, but are not limited to, soft wheat flour, corn flour, modified food starch and combinations thereof. Other dry ingredients that can optionally be included are leavening, coloring, and flavoring agents. For specific examples of suitable batter compositions see, e.g., U.S. Pat. Nos. 5,527,549 and 6,288,179.

A "breading" as used herein has its usual meaning in the art and generally refers to any of a variety of cereals, such as corn flour, rice flour, wheat flour, corn flakes and bread crumbs that are applied to a foodstuff. The breading ingredients can be raw, partially-cooked or fully-cooked. Often the breading is ground to at least 100% through a U.S. No. 3 or 4 sieve.

"Thermal gelling agents" are proteins or non-proteins that are water-dispersible and that coagulate upon application of heat. These can be used to increase the adhesion and cohesion of breading applied to a foodstuff. An example of a protein-based gelling agent is egg albumin. Examples of non-protein gelling agents include, but are not limited to, hydroxypropylmethylcellulose, agar, gelatin and unmodified food starches.

"Fat" is a water-insoluble material derived from plants or animals and is composed primarily of a mixture of glycerol esters (e.g., triglycerides). At room temperature, fats typically exist as semi-solids.

An "oil" is a fat in liquid form. Because during cooking (e.g., frying or baking) a fat is present as a liquid, the term oil can appropriately be used interchangeably with the term fat (see, e.g., Robert S. Igoe, Dictionary of Food Ingredients, 2nd ed., 1989).

II. Overview

Foodstuffs coated with one or more thermally coagulating proteins that render foodstuffs less permeable to fat and oil in the frying medium, and thus reduce the amount of fat or oil absorbed by the foodstuff during cooking are provided. Methods for preparing such foodstuffs are also disclosed. A variety of compositions useful in coating foodstuffs are also described.

The food products, coatings and food preparation methods that are disclosed herein have value in view of the increased demand by consumers for foods that are lower in fat and oil but that have increased protein content. As described in greater detail below, one group of thermally coagulating proteins that have been found to be useful in the foodstuffs and compositions that are provided are whey proteins, including whey proteins present in fractions of whey or individual proteins that are major components of whey, such as α-lactalbumin and β-lactoglobulin. It should be understood, however, that these particular proteins are exemplary and that the application is not limited to these particular proteins.

The methods described herein generally utilize coating compositions with relatively high concentrations of the thermally coagulating protein (e.g., whey protein). Typically, the composition comprises at least 2% protein by weight and, depending upon the application, at least 10-15% protein by weight, on up to about 40-55% protein by weight. In certain specific applications, the protein concentration can be lower, for example when specific types of whey protein sources are utilized (e.g., reduced mineral whey, high gel whey and hydrolyzed whey).

Use of thermally coagulating proteins such as whey proteins at the general concentration levels described herein would not be expected to yield beneficial results given the general view in the art that thermally coagulating proteins like whey protein should be avoided in food coatings, or at most used at very low levels (see, e.g., patents listed in Background). So the use of thermally coagulating proteins such as whey proteins in food coatings at the levels described herein is an unexpected result given the generally prejudicial view in the art.

The current inventors have also found that coatings with relatively low protein concentrations form unstable films on the underlying foodstuff. Furthermore, for protein compositions such as whey that have relatively high sugar content, inadequate amounts of protein in the coatings can result in excessive browning of the foodstuff (i.e., the food become too dark in color). At higher protein levels, in contrast, foodstuffs cooked in oil and fat have been found to exhibit good color characteristics (e.g., browning) and texture (e.g., the crispiness desired in food cooked in fat or oil). The use of whey protein in the coating is also desirable because it has a relatively neutral flavor that does not affect the taste of the foodstuff being prepared, unlike certain other proteins that can impart an undesirable flavor. The present coatings and compositions are thus useful in reducing fat and oil permeability and/or absorption of foodstuffs prepared by frying, baking or other cooking methods involving fat or oil, but maintain the desired color, texture, moisture content and other favorable characteristics. The coatings can also aid in the retention of water, thus resulting in a plumper product.

When the compositions that are provided are used to coat foodstuffs, significant reductions in fat or oil absorption by the foodstuff can be obtained. This result is achieved because the coatings once heated act to decrease the permeability of the foodstuff to oil and fat. For example, with the coatings that are disclosed herein fat or oil absorption into the foodstuff can be reduced by at least 5%, 10% or 15% relative to a corresponding foodstuff of the same type that is not coated with the thermally coagulating protein (e.g., whey composition). In other instances, fat or oil absorption is reduced by at least 70-90%.

Without intending to be bound by any theory, the ability of the disclosed compositions to inhibit fat and oil absorption is thought to be due to the inclusion of thermally coagulating proteins in the composition. With proteins of this type, the gel or film is formed after at least a part of the protein has been heat denatured. Gel formation typically involves a number of consecutive reactions: (1) protein molecules become denatured; (2) denatured molecules aggregate to form (roughly spherical or elongated) particles; and (3) these particles then aggregate further to form a space-filling network. Thus, for film formation, the protein should be soluble, capable of rapidly diffusing to an oil-water interface, where it can reorient, unfold to some degree, and then spread, with one or more segments occupying the non-polar oil phase. Extensive interactions should occur among contiguous molecules, that is intermolecular interactions, to form a coherent film. The coatings so formed are thus able to reduce the permeability of foodstuffs to fat and oil.

Exemplary thermally coagulating proteins include, but are not limited to, whey protein, egg albumin, myosin, casein(s) and soy protein.

III. General Coating Compositions and Coating Methods

Certain food preparation methods that are provided herein generally involve providing a foodstuff and then applying a coating composition to the foodstuff. Some coatings typically contain a thermally coagulating protein that comprises at least 2, 3, 4 or 5% of the coating composition by weight. Other coatings contain at least 10, 11, 12, 13, 14, 15 or 20% thermally coagulating protein by weight. The protein concentration in the coating composition typically does not exceed 30, 35, 40, 45, 50 or 55% by weight. Thus, a typical range of thermally coagulating protein concentrations for some coatings is between about 2-55% by weight. The thermally coagulating protein concentration for other coatings is about 12-55%. In addition to the thermally coagulating protein, the coating composition also typically includes a base coating ingredient (e.g., water, oil or fat) in which the protein is mixed, but can also include various other ingredients such as starches, batter and/or breading. As described in greater detail below, the particular protein concentration level utilized depends in part upon the mode by which the composition is applied to the foodstuff and whether other ingredients are part of the coating composition.

Some coating compositions contain whey protein at the concentration levels just listed. The term "whey protein" refers to one or more proteins naturally present in or derived from whey. This means that the whey protein in the composition can be one or more proteins from any of a number of different whey protein source materials. A "whey protein source material" generally refers to sources such as whey, acid whey, sweet whey, concentrated whey, dry whey, reduced lactose whey, reduced minerals whey, whey protein concentrate, high gel whey, hydrolyzed whey, specific proteins from whey (e.g., α-lactalbumin and β-lactoglobulin), as well as combinations of one or more of the foregoing sources and sources derived from the foregoing sources. These source materials may optionally be in concentrated, diluted, instantized or agglomerated forms, for example. A "whey composition" is a composition that comprises whey protein and optionally additional ingredients such as starch, batter, breading, flavors, texturizers, and stabilizing agents. A whey composition thus may simply be one of the foregoing whey protein source materials or a mixture of such a source material with one or more other ingredients.

Coatings are typically prepared by adjusting the whey protein concentration of a whey protein source material (e.g., by concentrating or diluting) to obtain the desired concentration of whey protein appropriate for a given application (see, e.g., the concentrations listed above). But in some instances, certain whey protein source materials can be used directly.

As one illustration, a whey composition can be prepared from whey protein concentrate (e.g., 80% whey protein), typically by diluting it (e.g., with water or oil) to obtain a composition with the desired whey protein concentration. This diluted solution can optionally also be mixed with one or more additional ingredients (e.g., a breading, a batter, and/or a starch). Further illustrative examples of different whey coating compositions for specific application modes are described in greater detail below.

Again, without intending to be bound by any particular theory, whey proteins are believed to have the requisite properties useful in the type of coatings that are provided, because they can concentrate at an interface and then unfold and engage in extensive protein: protein interactions to form coherent films. Whey proteins retain significant structure, thus yielding bulkier, stronger films. Films composed of bulky proteins such as whey, which retain more tertiary structure, are usually more stable than proteins lacking structure. Such films also have better viscoelastic properties and can adapt to physical perturbations without rupture.

Some coating compositions are simply aqueous-based mixtures that include the protein and water. Other coating compositions are non-aqueous based and are mixtures of an oil or fat and the protein. But as alluded to above, the coating composition can also contain one or more other ingredients in addition to a thermally coagulating protein such as a whey protein. The composition (e.g., a whey composition) can also include, for instance, batter, breading, flavoring agents, thermal gelling agents, stabilizing agents, colors, anti-oxidants and preservatives.

When the whey protein source material is mixed with a liquid (e.g., water), it has been found unnecessary to heat the mixture of source material and liquid to form a coating composition that performs well once applied. This simplifies the overall coating procedure and reduces processing and the overall time to coat the desired foodstuffs. It has been found, for instance, that refrigerated whey protein source material can be combined with a liquid and the resulting composition refrigerated before applied to a foodstuff. In some applications, the coating composition is prepared at a temperature of about 4-38° C.; in other applications, the temperature coating is prepared at a temperature between about 18-32° C.

In some compositions, whey protein is substantially the only ingredient, or the only ingredient, that is mixed with the base coat ingredient (e.g., water, oil or fat) to form the coating. For example, some coatings contain a limited amount of another coating ingredient (e.g., protein or polysaccharide ingredient). A "limited amount" as used in the context of coating ingredients means that the weight of any given ingredient relative to the total weight of all the other ingredients except the base coat ingredient is typically less than 20, 15, 10, 5, 1 or 0.5% by weight. Some coatings, for instance, contain a limited amount of another protein, such as egg albumin, casein, gelatin, gluten, peanut protein concentrate, soy protein or soy protein isolate, shellac and rice bran. Certain coatings contain a limited amount of a polysaccharide. Examples of such polysaccharides include celluloses (e.g., methyl cellulose, ethyl cellulose, hydroxyl propyl cellulose, hydroxyl propyl methyl cellulose), starches (e.g., potato and corn), alginates, curdlan, gums (e.g., gellan gum, locust bean gum), pectin, chitosan and carrageenan. Some coatings contain a limited amount of other ingredients such as fibers, dextrins and flours (e.g., wheat and rice flours). The coatings may contain a limited amount, or be free, of one, some or all of the foregoing ingredients (i.e., proteins, polysaccharides or other ingredients). Some coatings thus consist essentially of or consist of whey protein.

These coatings can be applied to a variety of different foodstuffs. The term "foodstuff", "food product" or other related terms as used herein refer to essentially any type of food item that is compatible with the coating and heating processes of the disclosed methods. Suitable foods include, but are not limited to, cereal-based products, cheese, poultry, beef, pork, seafood, potatoes, vegetables, fruit, candy and nuts. Diverse types of cereal-based products can be utilized. Exemplary food products of this type include pizza dough, burritos, dough-enrobed sandwiches, hand-held foods, bread dough, bagel dough, scones, cereals, pastries, and grain-based snack foods (e.g., crackers and pretzels). Hand-held foods include, for example, burritos, sandwiches (including pocket sandwiches) and pitas. The cheese can be of a variety of types that are compatible with heating (e.g., mozzarella, provolone, cheddar, Swiss, Colby, Pasteurized Process Cheese(s), flow/melt resistant cheese(s), and imitation/analogue cheese(s)), including various string cheeses and cheese curds. If potatoes are utilized in the methods, they can be used in a variety of different forms including, chips, French fries, hash browns, and strings. Likewise, vegetables of various types can be utilized. Vegetables commonly used are mushrooms, zucchini, peppers (e.g., jalapenos) and cauliflower.

Initial preparation of a foodstuff to be coated is according to methods that are generally known in the food industry to be appropriate for the particular type of foodstuff being coated. For example, foodstuffs are washed, cut to size and/or ingredients for the foodstuff combined to prepare the food substrate to be coated. The water content of the food can optionally be adjusted to a desired range and/or the food partially cooked (e.g., par-fried or par-baked) prior to applying the coating.

The composition can be coated onto the foodstuff using essentially any technique utilized in the art. Examples of suitable approaches include spraying, dipping, basting and brushing.

The foodstuff can optionally be battered and/or breaded. This can be done before, during or after application of the coating composition to the foodstuff. For example, a foodstuff can first be coated with the coating composition and then the batter and/or breading applied. Alternatively, a layer of batter and/or breading is applied, the coating composition is then applied, and finally another layer of batter and/or breading is applied. Such methods typically involve first applying a layer of batter to the substrate, then the coating composition and finally a breading layer. Yet another option is to apply the batter and/or breading and then apply the coating composition. As noted above, the coating composition itself can include a batter and/or breading. In which case, the coating composition and batter and/or breading are applied simultaneously.

After the coating composition has been applied, the coated foodstuff may be allowed to dry and/or sit to allow excess coating composition to be removed and for the coating composition to be absorbed. In some methods, the coated foodstuff is frozen or partially cooked (e.g., par-fried or partially baked) and stored for later use. In some applications, however, it is unnecessary to allow the coating to dry and no drying period required. Thus, some methods involve directly cooking the coated foodstuff once the coating has been applied.

Once the foodstuff is to be served, it typically is heated to a temperature that is sufficiently hot to cause the protein in the coat to denature. As described above, the resulting denatured protein then spreads to form a film that reduces the porosity of the foodstuff and restricts absorption of oil and fat by the underlying foodstuff. Any heating procedure utilized in the cooking industry can be utilized to heat the substrate. Typically, heating is accomplished in the presence of a fat or oil. Examples of suitable heating options include, but are not limited to, frying (including deep fat frying), heating with a radiation or convection oven, microwaving, steaming, high pressure extruding and heating on a rotating drum.

Significant reductions in fat and/or oil absorption can be achieved relative to comparable foodstuffs that have not been coated with the compositions described herein. For instance, fat and oil absorption is typically reduced by at least 5%, 10%, or 15% by weight relative to a corresponding foodstuff of the same type that is uncoated. In some applications, reductions of at least 30, 35, 40, 45 or 50% by weight is achieved. The reduction in still other application is at least 75, 80, 85, 90, or 95% by weight.

IV. Exemplary Coating Compositions and Methods

It should be understood that all of the various coatings described below can be prepared from whey proteins that are present in or derived from the various whey protein source materials described herein, including whey, sweet whey, concentrated whey, dry whey, reduced lactose whey, reduced minerals whey, whey protein concentrate, high gel whey and hydrolyzed whey, as well as individual proteins present or obtained from whey. As indicated above, these whey protein source materials are used directly, mixed with other ingredients, and/or concentrated or diluted to obtain the whey protein concentration that is appropriate for the particular type of coating. Instantized and agglomerated forms can also be used. A description of exemplary coatings that can be prepared follows.

For example, if the coating composition is to be sprayed onto the foodstuff, the concentration of protein in the composition is adjusted such that the composition can be converted into an aerosol. A typical coating composition used in spray applications is an aqueous-based solution that includes water and protein. Certain whey compositions useful for spray applications are a mixture of water and whey protein. In such compositions, the whey protein concentration is typically at least 2, 3, 4 or 5% by weight. For other coatings, the whey protein concentration is at least 10, 11, 12, 13, 14 or 15% by weight. The upper limit on the whey protein concentration in such compositions is usually 20, 25 or 30% by weight. A typical whey composition used in certain spray applications, for instance, contains about 2-30% whey protein by weight. Other compositions contain at least 12, 13, or 14% whey protein by weight up to 30% whey protein by weight. Coatings such as these can readily be prepared, for example, by mixing an appropriate amount of whey protein concentrate (WPC) with water to obtain the desired protein concentration. For instance, to prepare a 20% whey protein solution, 25 grams of whey protein concentrate (typically 80% whey protein) is mixed with 75 grams of water. Compositions can be sprayed on the foodstuffs using a variety of methods known in the food industry including, but not limited to, hand spraying with bottles and automated spraying/misting machines.

Coating compositions can also be applied by conventional dipping methods. These compositions can have somewhat higher protein concentrations than compositions that are applied by spraying because it is not necessary for the composition to be converted into an aerosol. This means that more viscous solutions can be used. Consequently, although whey compositions for use in dipping applications typically have the same minimal amount of whey protein as compositions to be applied by spraying, the upper limit can be higher (e.g., 40, 45 or 50% by weight). Whey compositions with such protein concentrations can also be prepared by mixing appropriate amounts of water and whey protein concentrate. To apply the compositions by dipping, the foodstuff can be dipped by hand into the coating composition, submerged into vats using automated machines, or dipped using other conventional methods that are known in the food industry.

Other coating compositions include a batter. If a batter is desired for a particular foodstuff, inclusion of the batter as part of the coating composition avoids having to apply the coating composition onto the battered foodstuff as a separate step. Compositions of this type generally have relatively high protein concentrations. For whey compositions that include a batter, for example, a typical lower limit is about 20, 25, 30 or 35% whey protein by weight. The upper whey protein concentration is about 45, 50 or 55%. A typical whey protein concentration for a composition that contains a batter is thus about 30-55% or 30-50% whey protein by weight. Coating compositions that include a batter can be applied by submerging the foodstuff in the composition, passing the foodstuff through a waterfall of the composition, by spraying the composition onto the foodstuff or by other conventional methods.

Coating compositions that include a breading can also be utilized. In this instance, the protein concentration is typically at least 3, 4 or 5% by weight, but can be higher (e.g., at least 10, 11, or 12% by weight). Usually the whey protein concentration in compositions of this type does not exceed 15 or 20% by weight. Thus a typical whey composition that includes a breading has a whey protein concentration of about 5-20% by weight; other compositions are at least 11 or 12% up to about 20% by weight. Coating compositions that include a breading can be applied by methods that are well established in the industry. Typically, food stuffs are moistened (e.g. with batter) and rolled in a breading composition. In other approaches, a battered foodstuff is transferred along a conveyor belt onto which a curtain of breading falls, thereby coating the foodstuff.

Another option for applying the coating composition is to prepare a slurry or paste that includes the protein and an oil or fat. With such an approach, the whey protein concentration is generally at least about 20, 25 or 30% by weight. The upper limit to the whey protein concentration is generally about 40, 45 or 50% by weight. For a whey composition that includes whey protein and an oil or fat, the whey protein concentration typically ranges from about 30-50% by weight. Coating compositions of this type can be applied by various approaches. One technique is to spread the composition onto the foodstuff. Another option is simply to place the foodstuff in contact with a layer of the composition and apply heat. If the composition includes a fat, application of heat causes the fat to melt; the melted fat can then spread to form a coating on the foodstuff.

A starch is included in some coating compositions to help achieve desired browning and textural characteristics, for instance. The starch can be any of a variety types including, but not limited to, modified or unmodified high amylose, tapioca dextrins, corn starch, modified potato starch and modified food starch. If a starch is incorporated into the coating composition, it typically is present in a concentration of at least about 10, 15 or 20% by weight, but generally not more than about 30, 35 or 40% by weight. The concentration of whey protein in such compositions is usually at least about 10, 11, 12, 13, 14 or 15% by weight, but not more than about 20, 25 or 30% by weight. In general, the starch concentration ranges from about 20-40% by weight and the whey protein concentration ranges from about 15-30% by weight.

The foregoing types of coatings can also be prepared using whey protein that has been denatured (predenatured whey protein). In some applications, prior denaturation of the whey protein can promote formation of the film on the surface of the foodstuff, rather than simply relying on the denaturation that occurs once the coated foodstuff is heated. Predenaturation of the protein thus reduces the time necessary to create the film that reduces oil and fat absorption. Predenaturation of the whey protein can be accomplished using various approaches including, heating, irradiation and chemical methods (e.g., contacting the protein with urea, guanidine hydrochloride, and various salts). The concentration of the denatured protein incorporated into the coating composition is generally at the levels set forth above for the various types of coating compositions, although in some instances the concentration can be lower.

Coatings such as the various ones described above can also be prepared from protein fractions obtained from whey, including substantially pure individual proteins obtained from whey. A "substantially pure" protein as used herein refers to a protein that typically is at least 70% or 80% pure protein, in other instances at least 85 or 90% pure, and in still other instances at least 95, 98, 99 or 100% pure. These percentages refer to the weight of the protein of interest expressed relative to the total weight of all proteins in the composition as expressed on a percentage basis. Examples of such coatings are those prepared from α-lactalbumin and/or β-lactoglobulin, the two major protein components of whey. These proteins can be purchased from Leprino Foods Company or by protein purification methods that are conventional in the industry. These proteins can be incorporated into coating compositions as substantially pure forms or as mixtures. The concentration of these proteins is generally at the levels described above. In some applications with this type of coating the protein concentration can be lower. Some methods thus involve applying a coating in which the whey protein is at least 70, 80, 90, 95, 99 or 100% pure α-lactalbumin and/or β-lactoglobulin.

Other coatings are prepared from whey protein source materials having defined mineral content. The concentration of minerals in the whey composition can in some instances be utilized to control in part the rate at which the denatured proteins coagulate to form a film, as well as characteristics of the film itself. Certain coating materials are prepared from reduced mineral whey or reduced mineral whey protein concentrate. Other coating materials are prepared from high gel whey sources, which typically include added calcium and/or other minerals. These added minerals typically speed up the rate at which the denatured proteins coagulate to form a film. The whey protein concentration in coatings prepared from these source materials generally falls in the ranges listed above depending upon the particular mode in which the coating is applied. In some instances, the concentration can be lower.

One exemplary method involves preparing a foodstuff (e.g., string cheese) by first coating the foodstuff with a batter and/or breading and then coating the foodstuff with one of the coating compositions described herein. The coated foodstuff is then partially cooked (e.g., par-fried or par-baked) and then can be refrigerated until ready for use. The foodstuff is then thawed and cooked using any conventional cooking technique. This approach has been found to provide excellent results, even when the foodstuff is heated by microwaving, yielding a final product that is crispy and that has a nice golden color.

Coatings can also be used in the preparation of ice cream cones to form a coating on the inside of the cone (optionally the outside as well). The coating can maintain the integrity of the cone once ice cream has been added into the cone. An approach used in some novelty ice cream products is to coat the inner surface of the ice cream cone with chocolate. This can be undesirable because of the cost of chocolate. The coatings described herein can be used as a substitute at considerably lower cost.

V. Coated Products

Products coated with the compositions that are disclosed herein are also provided. These can be products that have only been coated but not yet heated such that the proteins in the coating have not been denatured, as well as products that have been heated sufficiently such that the proteins have formed a film that is effective to reduce the absorption of fat and oil. The type of coated foodstuff includes all the various types of foods listed above.

The concentration of the proteins added with the coating relative to the food item varies somewhat with respect to the size and weight of the particular foodstuff. In general, the whey protein concentration is at least about 0.01, 0.05, 0.1, 0.5, 1.0, 2.0 or 3.0% by weight of the coated food product (i.e., the combined weight of the foodstuff and the coating). Generally the whey protein accounts for no more than about 10, 15, 20, 25 or 30% of the weight of the coated food product. Thus, in some food products, for example, the whey protein is about 0.01 to about 27% by weight of the coated food product, in other instances about 0.05 to about 15% by weight of the coated food product, and in still other instances about 0.5 to about 3.0% by weight of the coated food product. For relatively small food items such as chips, snack-foods (e.g., fried cheese sticks), crackers and French fries, the protein concentration relative to the coated foodstuff is generally in the range of about 0.01 or 0.5 up to about 18% by weight. For larger food items such as pizza dough, scones, fried chicken, the protein concentration relative to the coated foodstuff is generally in the range of about 0.1 or 0.5 up to about 20% by weight.

For foodstuffs that are battered, the protein concentration in the coating composition generally ranges from about 0.6 to about 18% by weight relative to the coated foodstuff. In breaded foodstuffs, the protein from the composition relative to the weight of the coated foodstuff usually is about 0.6 to about 9% by weight. For foodstuffs that have been both battered and breaded, the protein from the composition relative to the weight of the coated foodstuff typically ranges from about 1.2 to about 27% by weight.

The following examples are presented to illustrate certain aspects of the disclosed methods, compositions and products but are not to be construed so as to limit the scope of the claimed invention.

EXAMPLE 1

Fat Reduction During Cooking of Coated Pizza Crust

This example describes a test conducted to determine the ability of a whey composition to reduce the permeability of a fried food, in particular a pizza crust, to a surrounding frying medium.

A whey composition for using in coating a pizza crust was prepared by mixing an 80% whey protein concentrate (Instantized WPC 80—Grade A, Leprino Foods Company) with water, the mixture containing 25% whey protein concentrate and 75% water, thus yielding a whey composition having a final whey protein concentration of 20% by weight. The pizza crust was formed by rolling a 16-oz ball of raw pizza dough to a crust having a 12 inch diameter. The whey composition was applied to one side of the raw dough such that the whey protein concentration was approximately 0.80% by weight. Following application of the protein, the dough was placed in a pan containing 2-oz of soybean oil (Ventura Foods, LLC Item #54135), such that the dough surface to which the protein had been applied was in direct contact with the oil. A control set of dough was prepared in the same manner but was not coated with the whey composition. Both the treated and control dough were baked at 420° F. for 11 minutes and 30 seconds. Following baking, each dough was tested for total fat content following AOAC Method 935.38. The control dough to which no whey composition was applied contained 9.50% fat. The dough coated with the whey composition, in contrast, contained only 6.00% fat.

These results demonstrate that the coating reduced fat absorption by the pizza crust by nearly 37%. In addition to the fat reduction, the baked dough to which the whey composition was applied was less greasy and had a crispier texture compared to the uncoated baked dough, which was greasy and had a softer/soggier texture.

EXAMPLE 2

Fat Reduction During Cooking of Battered and Breaded String Cheese

A batter was prepared by dispersing in water a 40% solids mixture containing 25% solids by weight Batter Mix (Kerry Food Ingredients Item #G2661) and 15% solids by weight of a gelling 80% WPC.

Twenty samples of string cheese were dipped in the batter, predusted (Kerry Food Ingredients Item #G4113) with flour, followed again by dipping in the batter, adhering a breading (Kerry Food Ingredients Item #G5068) to the surface followed by freezing. The battered and breaded string cheese was then fried for 2 minutes at 370° F. Another twenty samples, serving as control product were treated in the same way except that the gelling 80% WPC was eliminated from the batter.

Table 1 below shows the average fat content post fried control product vs. product treated with a batter containing 15% by weight of the gelling 80% WPC.

TABLE 1

| Fried String Cheese with Protein Batter | |
|---|---|
| Control String Cheese (no protein coating) | 14.99% |
| Test String Cheese (with protein coating) | 12.56% |
| Fat reduction | 2.43% (reduction of 19.34%) |

EXAMPLE 3

Fat Reduction During Cooking of Battered and Breaded String Cheese Coated with Beta-Lactoglobulin Battered and breaded string cheese as prepared for control product in Example 2 was treated by spraying a 15% total solids solution of gelling 80% beta-lactoglobulin protein on the surface of the breading, such that a total of 5 grams of protein solution was applied to each string of cheese. The sprayed string cheese was subsequently frozen overnight then deep fried at 370° F. for 2 minutes. In addition to reduced fat absorption (Table 2), observations include (1) that battered and breaded string cheese coated with protein resulted in less blowouts of hot cheese through the breading during cooking than battered and breaded string cheese to which no protein was applied, (2) battered and breaded string cheese to which protein was applied and fried resulted in a volume increase such that the product was larger (plumper) than cheese in which no protein was applied, and (3) the string cheese fried in the presence of a protein coating is crispier than product not coated with the protein coating.

TABLE 2

| Fried String Cheese Protein Solution Applied | |
|---|---|
| Control String Cheese (no protein coating) | 16.06% |
| Test String Cheese (with protein coating) | 14.29% |
| Fat reduction | 1.77% (reduction of 12.38%) |

EXAMPLE 4

Fat Reduction During Cooking of Battered and Breaded Chicken

Chicken strips were marinated in a solution containing 15% total solids of a gelling 80% WPC. The marinated chicken strips were then breaded. Control chicken strips were marinated in a similar solution that did not contain protein and were breaded using the same breading mix. Breaded chicken strips were deep fried for 10 minutes at 370° F. Table 3 shows the resulting fat reduction when deep fried chicken is coated with a protein coating.

TABLE 3

| Fried Chicken Strips | |
|---|---|
| Control Chicken (no protein coating) | 6.12% |
| Test chicken (with protein coating) | 4.54% |
| Fat reduction | 1.58% (reduction of 34.80%) |

EXAMPLE 5

Fat Reduction During Cooking of Coated Pizza Crust

A whey composition for using in coating a pizza crust was prepared by mixing a gelling 80% whey protein concentrate (Grade A, Leprino Foods Company) with water, the mixture containing 20% whey protein concentrate and 80% water, thus yielding a whey composition having a final whey protein concentration of 16% by weight. The pizza crust was formed by rolling a 16-oz ball of raw pizza dough to a crust having a 12 inch diameter. The whey composition was applied to the raw dough such that the whey protein concentration was approximately 0.80% by weight. Following application of the protein, the dough was placed in a pan containing 2-oz of soybean oil (Ventura Foods, LLC Item #54135), such that the dough surface to which the protein had been applied was in direct contact with the oil. A control set of dough was prepared in the same manner but was not coated with the whey composition. Both the treated and control dough were baked at 420° F. for 11 minutes and 30 seconds. Following baking, each dough was tested for total fat content following AOAC Method 935.38. The control dough to which no whey composition was applied contained 13.2% fat. The dough coated with the whey composition, in contrast, contained only 2.7% fat.

These results demonstrate that the coating reduced fat absorption by the pizza crust by nearly 79%. In addition to the fat reduction, the baked dough to which the whey composition was applied was less greasy and had a crispier texture compared to the uncoated baked dough, which was greasy and had a softer/soggier texture.

It is understood that the examples and embodiments described herein are for illustrative purposes only and that various modifications or changes in light thereof will be suggested to persons skilled in the art and are to be included within the spirit and purview of this application and scope of the appended claims. All publications, patents and patent applications cited herein are hereby incorporated by reference in their entirety for all purposes to the same extent as if each individual publication, patent or patent application were specifically and individually indicated to be so incorporated by reference.

What is claimed is:

1. A method for cooking a foodstuff in fat or oil that reduces fat or oil absorption by the foodstuff, the method comprising:
    (a) providing a foodstuff that is coated with a whey composition, wherein the whey composition comprises whey protein, the whey protein comprising α-lactalbumin, wherein α-lactalbumin is at least 80% of the protein in the whey composition; and
    (b) heating the foodstuff in the presence of fat or oil, whereby the whey composition coating the foodstuff forms a film on the foodstuff that reduces absorption of fat or oil by the foodstuff relative to a corresponding uncoated foodstuff.

2. The method of claim 1, wherein the whey composition is about 0.5 to about 3.0% by weight of the foodstuff.

3. The method of claim 1, wherein the whey composition is a mixture of water and whey protein concentrate.

4. The method of claim 1, wherein the whey composition is derived from a reduced minerals whey, a high gel whey, a hydrolyzed whey, an acid whey, a sweet whey, a whey protein concentrate, or combinations of the foregoing.

5. The method of claim 4, wherein the whey composition is derived from an acid whey.

6. The method of claim 4, wherein the whey composition is derived from a sweet whey.

7. The method of claim 1, wherein the foodstuff is selected from the group consisting of cereal-based products, hand-held foods, cheese, poultry, beef, pork, seafood, vegetables, fruit, candy, ice cream cone, and nuts.

8. The method of claim 7, wherein the cereal-based products are selected from the group consisting of pizza dough, pastries, burritos, hand-held food, bread dough, cereals, dough enrobed sandwiches and grain-based snacks.

9. The method of claim 1, wherein the foodstuff is heated by deep fat frying.

10. The method of claim 1, wherein the foodstuff is heated in an oven.

11. The method of claim 1, wherein the foodstuff is a pizza dough crust and heating comprises placing the pizza dough crust in contact with a layer of oil and heating the oil.

12. A coating composition for application to a foodstuff to reduce fat or oil absorption by the foodstuff, the coating composition comprising:
    (a) a whey composition that comprises whey protein, the whey protein comprising α-lactalbumin, wherein α-lactalbumin is at least 80% of the protein in the whey composition; and
    (b) an ingredient selected from the group consisting of an oil, a batter, a breading and a starch, or a combination thereof, wherein the whey protein is about 12%-55% by weight of the coating composition.

13. The coating composition of claim 12, wherein the coating composition comprises an oil and the whey protein concentration is about 30-50% by weight of the coating composition.

14. The coating composition of claim 12, wherein the coating composition comprises a batter and the whey protein concentration is about 30-55% by weight of the coating composition.

15. The coating composition of claim 12, wherein the coating composition comprises a breading and the whey protein concentration is about 12-20% by weight of the coating composition.

16. The coating composition of claim 12, wherein
    the coating composition comprises a starch present at a concentration of 20-40% by weight of the coating composition; and
    the whey protein concentration is about 15-30% by weight of the coating composition.

17. A food product, comprising:
    (a) a foodstuff; and
    (b) a whey composition coated on the foodstuff, the whey composition comprising whey protein, wherein
        the whey protein comprises β-lactoglobulin, wherein β-lactoglobulin is at least 80% of the whey protein, and
        the whey protein concentration is about 0.5% to about 27.0% by weight of the food product.

18. The food product of claim 17, wherein the whey protein concentration is about 1.0% to about 15% by weight of the food product.

19. The food product of claim 17, further comprising a batter, and wherein the whey protein concentration is about 0.6% to about 18% by weight of the food product.

20. The food product of claim 17, further comprising a breading, and wherein the whey protein concentration is about 0.6% to about 9.0% by weight of the food product.

21. The food product of claim 17, further comprising a breading and a batter, and wherein the whey protein concentration is about 1.2% to about 27% by weight of the food product.

22. A method for reducing the permeability of a foodstuff to oil and fat, comprising:
 (a) providing a foodstuff that is coated with a whey composition, wherein the whey composition comprises at least 12% whey protein by weight, the whey protein comprising β-lactoglobulin, wherein β-lactoglobulin is at least 80% of the whey protein; and
 (b) heating the foodstuff, whereby the heated whey composition coating the foodstuff reduces the permeability of the foodstuff to oil or fat relative to a corresponding uncoated foodstuff.

23. The method of claim 22, further comprising coating the foodstuff with the whey composition before heating the foodstuff.

* * * * *